H. BROUSSEAU.
STEERING GEAR FOR SHIPS.
APPLICATION FILED OCT. 23, 1920.
1,392,394.
Patented Oct. 4, 1921.
2 SHEETS—SHEET 1.
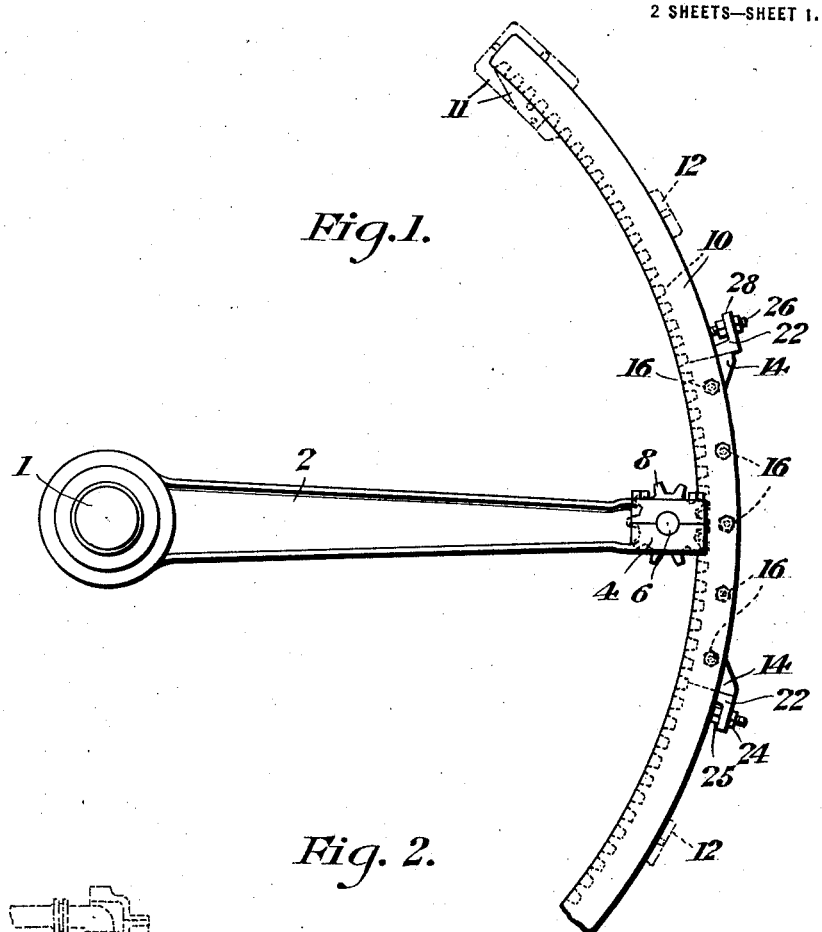
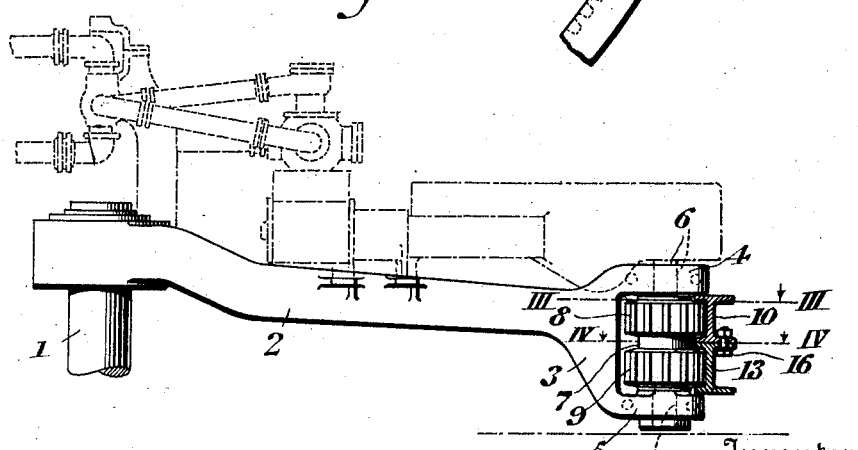
Inventor
Harry Brousseau
By
his Attorneys

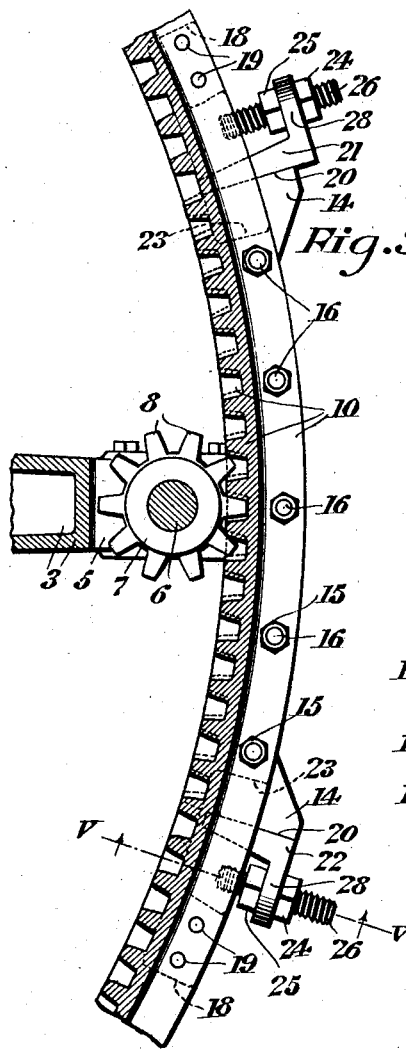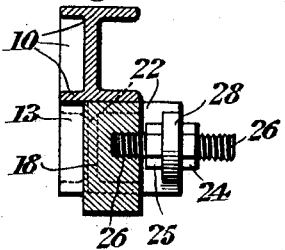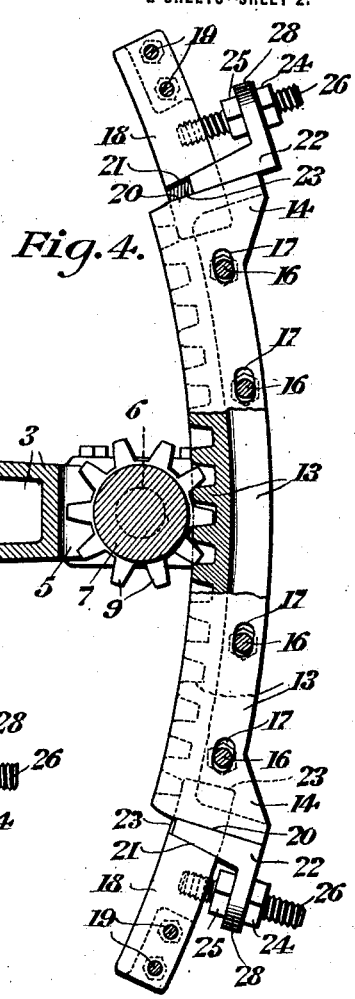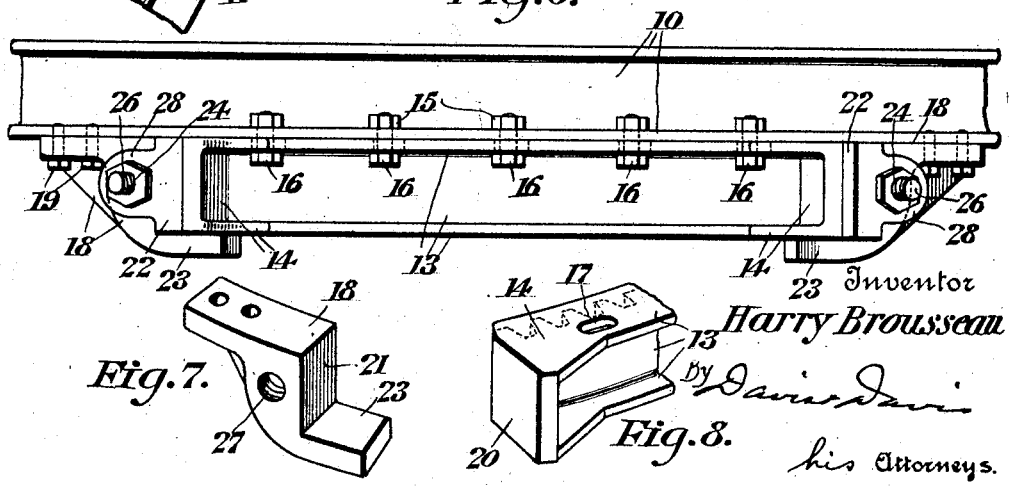

UNITED STATES PATENT OFFICE.

HARRY BROUSSEAU, OF BATH, MAINE.

STEERING-GEAR FOR SHIPS.

1,392,394. Specification of Letters Patent. Patented Oct. 4, 1921.

Application filed October 23, 1920. Serial No. 418,982.

*To all whom it may concern:*

Be it known that I, HARRY BROUSSEAU, a citizen of the United States, and resident of Bath, county of Sagadahoc, and State of Maine, have invented certain new and useful Improvements in Steering-Gears for Ships, of which the following is a specification.

This invention relates to improvements in steering gears for ships and is especially applicable for use in connection with various well-known forms of steam steering apparatus and combined hand and steam steering apparatus.

The invention has for its object to provide means for preventing lateral vibration or idle swinging of the rudder, especially when the rudder is adjusted to extend directly fore and aft of the ship or in a slightly laterally deflected position, and thus prevent movement of the various parts of the steering apparatus by the rudder and chattering of the tiller driving gearing.

In the accompanying drawings,

Figure 1 is a plan view showing the improvements embodied in a well-known type of steam steering apparatus, only sufficient of such apparatus being shown to illustrate the application of the invention thereto;

Fig. 2 a side elevation showing the parts illustrated in Fig. 1, the steering engine and various other parts being indicated in dotted lines;

Fig. 3 a detail horizontal section taken on the line III—III of Fig. 2;

Fig. 4 a detail horizontal section taken on the line IV—IV of Fig. 2;

Fig. 5 a vertical section taken on the line V—V of Fig. 3;

Fig. 6 a detail rear view of the relatively adjustable racks and the means for adjusting said racks relatively to each other;

Fig. 7 a perspective view of one of the blocks at the ends of the auxiliary rack; and Fig. 8 a perspective view of one end of the auxiliary rack.

Referring to the drawings by numerals, 1 designates the rudder post or head and 2 the tiller or swinging steering arm, the tiller being keyed or otherwise rigidly held at one end to the upper end of the rudder post. The opposite end of the tiller is formed with a yoke portion 3 having superposed spaced arms 4 and 5 provided with suitable bearings in which a vertical shaft 6 is journaled. The shaft 6 extends upwardly above arm 4, and the usual steam steering engines and mechanism for transmitting power therefrom to shaft 6 for rotating said shaft in either direction are mounted on the tiller 2 in the usual manner. In Fig. 2 I have shown in dotted lines part of one well known form of steam power mechanism for rotating the shaft 6.

Fixed on shaft 6 is a sleeve 7 to which is rigidly held two spaced pinions 8 and 9 of identical size and construction, the teeth of the pinion 9 being located directly under and in register with the teeth of pinion 8. The pinion 8 meshes with the usual toothed segment or arcuate rack 10 which is rigidly mounted in the usual manner on brackets 11 and 12 secured to the deck of the ship, as indicated in dotted lines in Figs. 1 and 2. It will be obvious that when shaft 6 is rotated in either direction by the steering engine, the pinion 8 will be rotated and will travel along the curved rack 10 and thus swing the tiller 2. It will also be obvious that when the rudder is fore and aft, or substantially fore and aft, of the ship it is subject to vibration by motion of the waves, etc., and that unless some means is provided for preventing such vibration of the rudder and the resultant vibration of the tiller the teeth of gear 8 will be constantly chattering and pounding against the central teeth on the rack 10. To prevent this vibration, I provide the auxiliary pinion 9 and a short curved rack 13 with which pinion 9 meshes when the rudder extends approximately fore and aft of the ship.

The auxiliary rack 13 is curved on the same arc as rack 10 and the teeth on both racks are of the same size and pitch. Rack 13 is relatively short and is supported directly under and midway the ends of rack 10. Rack 13 is slidably held against the under side of rack 10 by bolts 16 which extend through short curved slots 17 in the rack 13 and through bolt holes in rack 10 and have nuts 15 threaded on their upper ends. A pair of blocks or abutments 18 are rigidly held to the under side of rack 10 by screws 19 in alinement with the opposite ends of rack 13. The ends of rack 13 are widened as shown at 14 and provided with vertical faces 20 spaced from vertically extending outwardly beveled faces 21 on blocks 18.

The auxiliary rack 13 is adjusted endwise so that its teeth will be staggered relatively to the teeth of the main rack 10. The rack 13 may be adjusted, and locked in its adjusted position, in various ways. In the construction shown a pair of wedges 22 are provided for this purpose. The wedges 22 have tapered portions extending between faces 20 and 21 and resting on extensions 23 of blocks 18 which extensions also support rack 13 at the ends of the rack. The wedges are adapted to be shifted inwardly and outwardly and locked in adjusted position by adjusting lock nuts 24 and 25 threaded on screws 26 screwed into sockets 27 in blocks 18. Each wedge is formed with an ear 28 provided with an opening through which screw 26 extends.

It will be obvious that by adjusting rack 13 so that one side of the teeth of gear 9 will bear against the teeth of said rack while the opposite side of the teeth of gear 8 bear against the teeth of rack 10, as shown in Figs. 3 and 4, gear 8 and rack 10 will resist movement of the tiller by the rudder in one direction and gear 9 and rack 13 will resist movement of the tiller by the rudder in the opposite direction. Idle vibration of the rudder and tiller and chattering of the tiller driving gearing is thus prevented, while at the same time the tiller may be readily swung to operate the rudder by rotating shaft 6. By providing a short auxiliary rack 13, the gear 9 will leave the rack after a short movement of the tiller in either direction when the helm is put over an appreciable degree in steering the ship and unnecessary friction is thus avoided.

What I claim is:

1. In a steering gear for ships, the combination of a tiller, a drive shaft journaled on the tiller, a pair of pinions fixed on said shaft with their teeth in alinement, a pair of arcuate racks having teeth meshing with the teeth of the pinions, means for holding one rack in fixed position, and means for adjusting the other rack endwise and positively holding it in its adjusted position, one rack being relatively short and located substantially centrally of the other rack.

2. In a steering gear for ships, the combination of a tiller, an arcuate stationarily held main rack, an arcuate auxiliary rack shorter than said main rack and formed with longitudinally extending slots, driving gearing on the tiller meshing with the racks, means extending through the slots in the auxiliary rack for adjustably holding said rack to the main rack intermediate the ends of the main rack, a pair of rigid abutments carried by the main rack adjacent opposite ends of the auxiliary rack, a pair of wedges interposed between the ends of the auxiliary rack and said abutments, and means for adjusting the wedges transversely of the racks and locking the wedges in their adjusted positions.

3. In a steering gear for ships, the combination of a tiller, a drive shaft journaled on the tiller, spur gear means rotatable with the shaft, main and auxiliary arcuate racks meshing with said spur gear means, means for stationarily supporting the main rack, means for adjustably holding the auxiliary rack to the main rack to move endwise, and means carried by the main rack for adjusting the auxiliary rack endwise and positively holding said auxiliary rack in its adjusted position.

4. In a steering gear for ships, the combination of a tiller, a drive shaft journaled on the tiller, spur gear means rotatable with the shaft, main and auxiliary arcuate racks meshing with said spur gear means, means for stationarily supporting the main rack, means for adjustably holding the auxiliary rack to the main rack to move endwise, the auxiliary rack being shorter than the main rack and located substantially centrally thereof, a pair of rigid abutments carried by the main rack and located adjacent the ends of the auxiliary rack, wedges interposed between said abutments and the ends of the auxiliary rack, and means for adjusting said wedges and holding them in adjusted position.

In testimony whereof I hereunto affix my signature.

HARRY BROUSSEAU.